Figure 1:
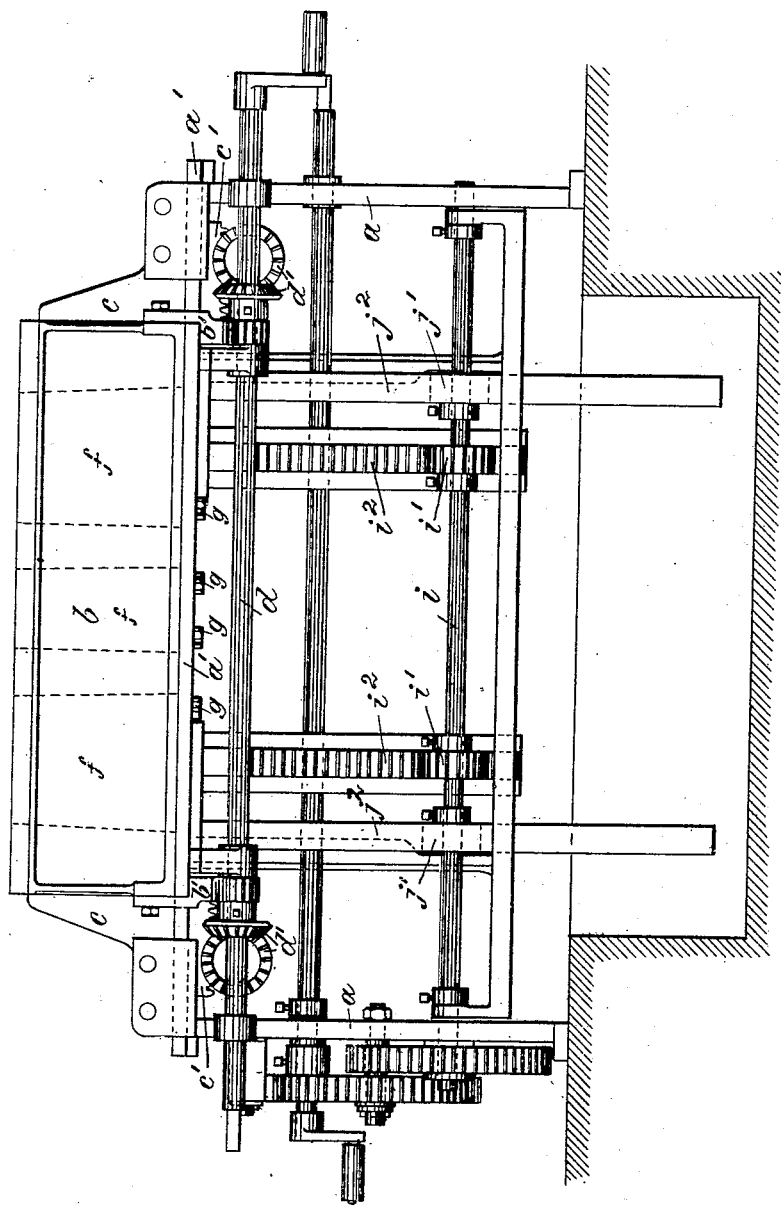

No. 703,081. Patented June 24, 1902.
N. F. PALMER.
MACHINE FOR MOLDING ARTIFICIAL STONE.
(Application filed Mar. 11, 1902.)
(No Model.) 3 Sheets—Sheet 1.

Witnesses: Inventor:
Arthur Zumpe Noyes F. Palmer,
Edward Ray. by his attorneys
Roeder & Breesey No. 703,081. Patented June 24, 1902.
N. F. PALMER.
MACHINE FOR MOLDING ARTIFICIAL STONE.
(Application filed Mar. 11, 1902.)
(No Model.) 3 Sheets—Sheet 2.
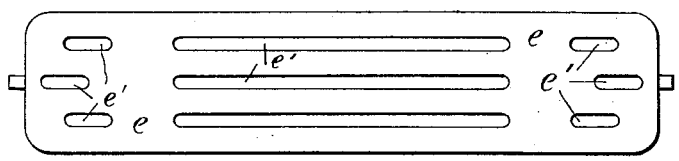
FIG. 2.
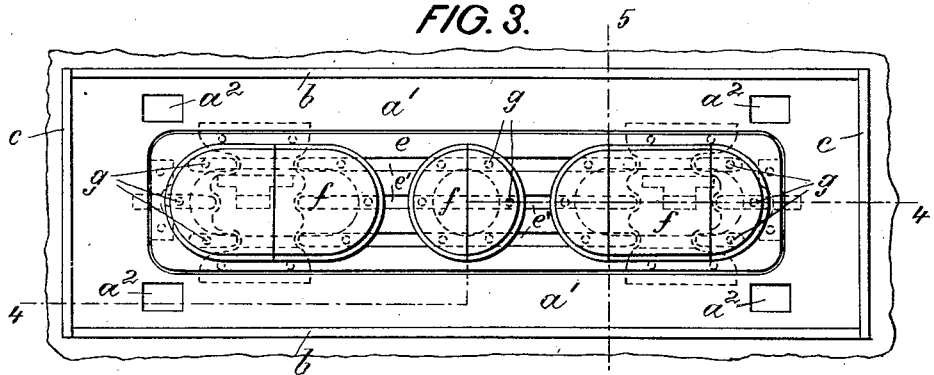
FIG. 3.
FIG. 4.
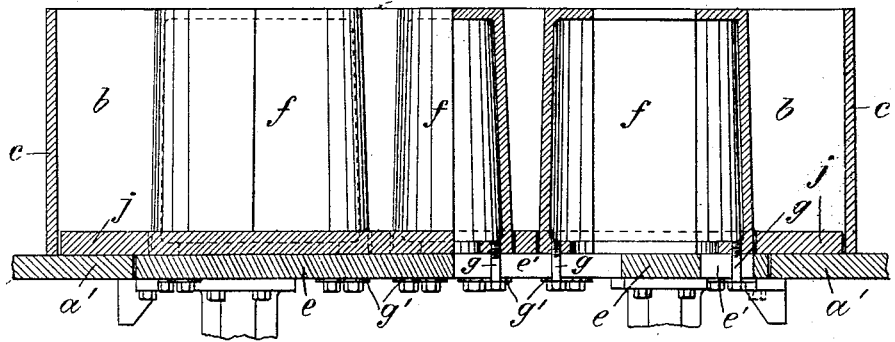
FIG. 5.
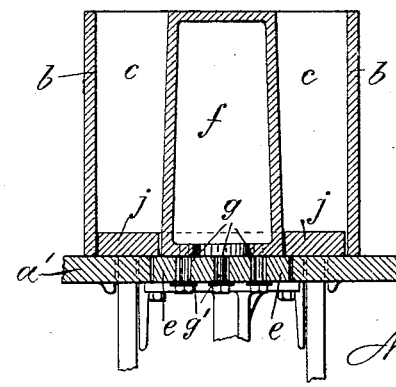
Witnesses:
Inventor:
Noyes F. Palmer
by his attorneys
Roeder & Briesen No. 703,081. Patented June 24, 1902.
N. F. PALMER.
MACHINE FOR MOLDING ARTIFICIAL STONE.
(Application filed Mar. 11, 1902.)
(No Model.) 3 Sheets—Sheet 3.
FIG. 6.
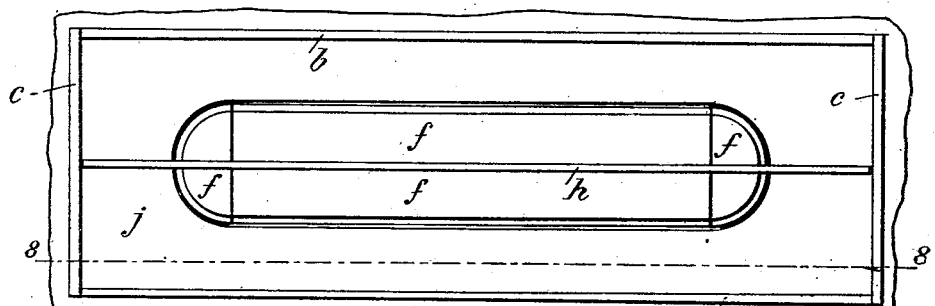
FIG. 7.
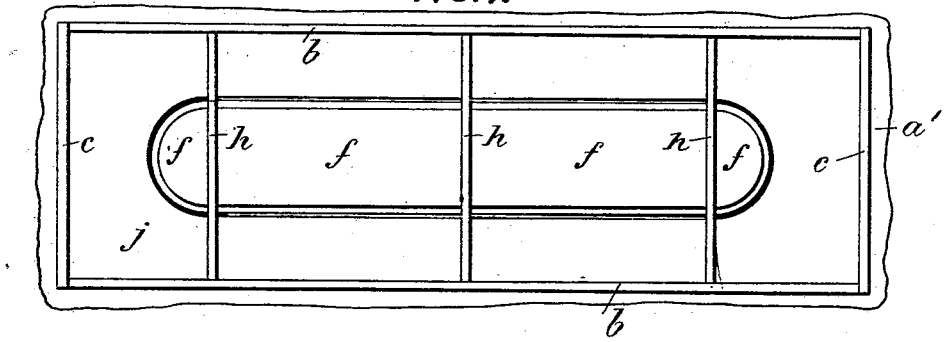
FIG. 8.
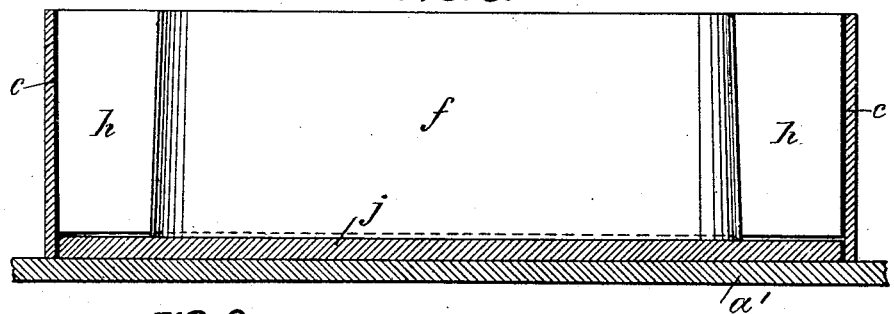
FIG. 9.
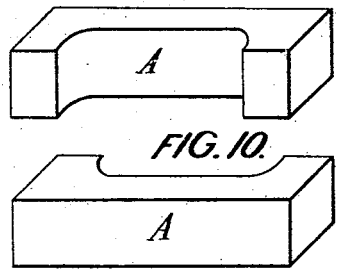
FIG. 10.
FIG. 11.
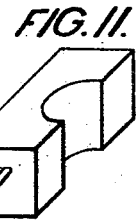
FIG. 12.
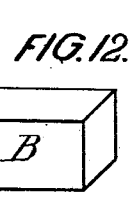
FIG. 13.
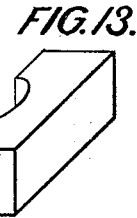
Witnesses:
Arthur Gumpe.
Edward Ray.
Inventor:
Noyes F. Palmer
by his attorneys
Roeder & Briesen
THE NORRIS PETERS CO., PHOTO-LITHO., WASHINGTON, D. C.

UNITED STATES PATENT OFFICE.

NOYES F. PALMER, OF BROOKLYN, NEW YORK.

MACHINE FOR MOLDING ARTIFICIAL STONE.

SPECIFICATION forming part of Letters Patent No. 703,081, dated June 24, 1902.

Application filed March 11, 1902. Serial No. 97,684. (No model.)

*To all whom it may concern:*

Be it known that I, NOYES F. PALMER, a citizen of the United States, and a resident of Brooklyn, county of Kings, and State of New York, have invented certain new and useful Improvements in Machines for Molding Artificial Stone, of which the following is a specification.

This invention relates to a machine for molding artificial concrete building and paving blocks, the construction being such that by a simple adjustment a great variety of sizes and shapes may be produced upon one and the same machine.

In the accompanying drawings, Figure 1 is a side elevation of my improved machine for molding artificial stone; Fig. 2, a top view of the core-support; Fig. 3, a top view of the mold-box with the false bottom removed; Fig. 4, a vertical longitudinal section taken on line 4 4, Fig. 3; Fig. 5, a cross-section on line 5 5, Fig. 3. Figs. 6 and 7 are plans of the mold-box, showing different arrangements of cores and partitions; Fig. 8, a vertical longitudinal section on line 8 8, Fig. 6; and Figs. 9 to 13 are perspective views of different forms of building-blocks molded by the machine.

The letter $a$ represents the frame of the machine, and $a'$ is the base-plate that forms the bottom of the mold-box. The sides $b$ and ends $c$ of the mold are sliding and may be moved inward and outward along the base-plate, so as to open and close the mold. This movement is effected by a shaft $d$, bevel-gear $d'$, and racks $b'$ $c'$, such construction, however, not forming part of the present invention.

The base-plate $a'$ has a central opening adapted to accommodate a plate $e$, that constitutes the support for cores $f$. These cores are sliding and are so connected to the support $e$ that they may be clamped thereto in any one of a large number of positions. By thus shifting the cores, altering their relative position, or using cores of different configurations or size I may mold a large variety of differently-shaped blocks by one and the same machine.

To effect the adjustment of the cores $f$ upon the support $e$, the latter is provided with a number of longitudinal slots $e'$, arranged, preferably, in a parallel direction, Fig. 2. Through these slots pass screws $g$, which carry washers $g'$ and are tapped into the cores. By tightening up the screws the washers are pressed against the bottom of the support $e$ to clamp the cores in place. By slackening the screws the cores are released and may be readily shifted and set to a new position.

I prefer to subdivide each single core into two or more separable sections, so that by a different relative arrangement of the sections a variety of different designs may be obtained. Thus in Fig. 3 the left-hand core is formed of two semi-oval sections, the central core of two semicircular sections, and the right-hand core of one oblong section and two flanking semicircular sections. In like manner the arrangements may be multiplied to change the form, size, and location of any or all the perforations or concavities of the block.

My construction of movable sectional cores also permits the simultaneous molding of a number of smaller blocks in lieu of a single large block. If small blocks are to be thus molded, the sections of the core are spread sufficient for the introduction between them of partitions or plates $h$. These partitions are sustained in an upright position by the core-sections themselves, which should, however, be so spaced that the partitions may be withdrawn from between them in a vertical direction. The partitions may be arranged either longitudinally or transversely and are of a length to project beyond the support $e$ and across the mold-bottom $a'$ up to the sides $b$ or ends $c$. In Fig. 6 I have shown a longitudinally-arranged partition, the necessary lateral separation of the core-sections being rendered possible by the width of the slots $e'$. With this adjustment I mold blocks A of the form shown in Figs. 9 and 10. In Fig. 7 are shown three transversely-arranged partitions. With this adjustment are molded four oblong blocks B, Fig. 12, and two blocks D of the form shown in Figs. 11 and 13. It is evident that in a similar manner an infinite variety of blocks may be produced.

The support $e$ is preferably vertically movable, so that the cores may be withdrawn by being lowered out of the mold. This movement is effected by a shaft $i$, pinions $i'$, and racks $i^2$.

Upon the mold-bottom $a'$ is placed a false bottom $j$, which is perforated to accommodate the cores. The false bottom embraces the cores and covers the plate $e$ around the cores, so as to close the exposed portions of the slots $e'$ and prevent the plastic mass from entering the same. The false bottom projects laterally beyond the support $e$, so that the free ends of the partitions $h$ rest thereon, the size of the false bottom being equal to the size of the mold. The false bottom may be moved upward, so as to raise the finished block out of the mold, the vertical movement being imparted to the false bottom from shaft $i$ through pinions $j'$ and racks $j^2$, that pass through openings $a^2$ of base $a'$.

In use the cores and partitions are set to the size and shape desired and then the concrete is tamped into the mold and struck off. The mold is opened and the false bottom is raised. By raising the false bottom, together with the molded block, the partitions $h$ are also raised off the support $e$ and out of the cores $f$, so that the latter may be lowered. After the block has been lifted to clear the mold it is removed, together with the false bottom and partitions, and is allowed to set while the machine is readjusted to mold a fresh block.

What I claim is—

1. In a machine for molding artificial stone, the combination of a mold with a slotted supporting-plate, a core, means for clamping the core to the plate, and a perforated false bottom which embraces the core and covers the slot beyond the core, substantially as specified.

2. In a machine for molding artificial stone, the combination of a mold with a slotted supporting-plate, a sectional core, means for clamping the core-sections to the plate, a partition between the core-sections, and a false bottom upon the plate, substantially as specified.

3. In a machine for molding artificial stone, the combination of a mold, with a vertically-movable core-support, a sectional core adjustably secured thereto, and a partition between the core-sections, substantially as specified.

4. In a machine for molding artificial stone, the combination of a mold, with a vertically-movable core-support, a sectional core adjustably secured thereto, a laterally-extending partition between the core-sections, and a false bottom for supporting the free ends of the partition, substantially as specified.

Signed by me at New York city, New York, this 10th day of March, 1902.

NOYES F. PALMER.

Witnesses:
WILLIAM SCHULZ,
F. V. BRIESEN.